United States Patent
Fan et al.

(10) Patent No.: US 6,979,430 B2
(45) Date of Patent: Dec. 27, 2005

(54) SYSTEM AND METHOD FOR CONTROLLING $NO_X$ EMISSIONS FROM BOILERS COMBUSTING CARBONACEOUS FUELS WITHOUT USING EXTERNAL REAGENT

(75) Inventors: Zhen Fan, Parsippany, NJ (US); Song Wu, Livingston, NJ (US)

(73) Assignee: Foster Wheeler Energy Corporation, Clinton, NJ (US)

(*) Notice: Subject to any disclaimer, the term of this patent is extended or adjusted under 35 U.S.C. 154(b) by 229 days.

(21) Appl. No.: 10/321,473

(22) Filed: Dec. 18, 2002

(65) Prior Publication Data

US 2004/0120872 A1 Jun. 24, 2004

(51) Int. Cl.[7] .......................... B01J 8/00; C01B 21/00; C01K 1/32
(52) U.S. Cl. .................... 423/239.1; 423/247
(58) Field of Search ............ 423/236, 239.1, 423/239.2, 246, 247

(56) References Cited

U.S. PATENT DOCUMENTS

| | | | | |
|---|---|---|---|---|
| 3,982,879 A | * | 9/1976 | Pfefferle | 431/10 |
| 4,562,795 A | * | 1/1986 | Kraus | 122/1 R |
| 4,980,137 A | | 12/1990 | Nelson et al. | 423/239 |
| 5,055,278 A | * | 10/1991 | Reidick | 423/235 |
| 5,067,419 A | * | 11/1991 | Kobayashi et al. | 110/234 |
| 5,163,374 A | * | 11/1992 | Rehmat et al. | 110/342 |
| 5,527,984 A | * | 6/1996 | Stultz et al. | 423/219 |
| 5,676,912 A | | 10/1997 | Sharma et al. | 423/213.2 |
| 5,950,417 A | * | 9/1999 | Robertson et al. | 60/776 |
| 6,365,118 B1 | | 4/2002 | Kharas et al. | 423/213.2 |

FOREIGN PATENT DOCUMENTS

EP 0 801 972 A1 10/1997

OTHER PUBLICATIONS

PCT International Search Report dated Apr. 22, 2004, issued in corresponding PCT patent appln. No. PCT/IB03/05980, mailed Apr. 29, 2004.

* cited by examiner

Primary Examiner—Colleen P. Cooke
(74) Attorney, Agent, or Firm—Fitzpatrick, Cella, Harper & Scinto

(57) ABSTRACT

A system and a method for controlling $NO_X$ emissions from a boiler that combusts carbonaceous fuels. The method includes the steps of (a) introducing carbonaceous fuel and combustion air into a furnace of the boiler for combusting the carbonaceous fuel in oxidizing conditions and producing flue gas including $NO_X$ and CO, and (b) leading flue gas from the furnace to a catalyst section in a flue gas channel for converting, free from introducing an external agent for $NO_X$ reduction, $NO_X$ to $N_2$ and CO to $CO_2$ by using CO as the reductant of $NO_X$ on a catalyst in the catalyst section.

12 Claims, 2 Drawing Sheets

SYSTEM AND METHOD FOR CONTROLLING NO$_X$ EMISSIONS FROM BOILERS COMBUSTING CARBONACEOUS FUELS WITHOUT USING EXTERNAL REAGENT

BACKGROUND OF THE INVENTION

The present invention relates to a system and a method for controlling the NO$_X$ levels in flue gases emitted from boilers combusting carbonaceous fuels. More particularly, the present invention relates to an NO$_X$ control scheme that is free from injecting an external NO$_X$ reducing agent.

NO$_X$ emissions from carbonaceous fuel-firing boilers originate from two sources: (1) thermal NO$_X$ due to oxidation of nitrogen in the air and (2) fuel NO$_X$ due to oxidation of nitrogen in the fuel. In today's boilers, with advanced combustion systems, thermal NO$_X$ is minimal, and NO$_X$ emissions are mainly formed from a small fraction of nitrogen in the fuel. The level of NO$_X$ produced in a combustion process is mainly determined by the temperature and stoichiometry of the primary combustion zone. The level of NO$_X$ emissions exiting from a combustor to the atmosphere results as an equilibrium between the NO$_X$ formation reactions and NO$_X$ reduction reactions.

Existing technologies for controlling NO$_X$ emissions from combustion sources fall within two categories: (1) minimizing the NO$_X$ formation in the combustion process and (2) reducing the the NO$_X$ level in the produced flue gas. In pulverized coal (PC) boilers, the NO$_X$ formation can be minimized by using specially designed low NO$_X$ burners (LNB) and by completing the coal combustion at the upper level of the furnace by over-fire-air (OFA). In fluidized bed combustion (FBC), the NO$_X$ levels are usually controlled by using a relatively low combustion temperature and by adjusting secondary air for optimized air staging. The main flue gas NO$_X$ reduction technologies include selective catalytic reduction (SCR) and selective non-catalytic reduction (SNCR), which both usually utilize ammonia or urea to destroy NO$_X$, once it has formed.

Today's new coal-fired utility boilers typically have NO$_X$ emissions in the range of 40–60 ppm. These low levels of NO$_x$ emissions are achieved by the optimized integration of both categories of NO$_X$ control technologies. For example, a common arrangement for PC boilers is an LNB/OFA system in combination with an SCR using ammonia or urea as the reductant. When using an LNB/OFA system, the NO$_X$ level at the exit of the furnace is typically in the range of 90–180 ppm.

The current low NO$_X$ technologies used in carbonaceous fuel-combusting boilers emphasize the precise control of combustion stoichiometry and temperature within the primary combustion zone. It is well known that a low level of excess air in the combustion zone may lead to increased CO emissions and unburned carbon in the ash. Thus, the current low NO$_X$ combustion technologies (LNB and FBC) are, due to CO emission concerns, unable to take full advantage of optimizing the amount of excess air. The currently used design strategy has thus been focused on reducing the available oxygen in the primary combustion zone to a low level to minimize NO$_X$ formation while at the same time maintaining high combustion efficiency and a low level of CO emissions.

A problem with the SCR and SNCR reduction systems, however, is that the use of excessive amounts of ammonia or urea to achieve very high NO$_X$ reduction levels leads to harmful ammonia emissions to the environment. Ammonia handling and injection systems create significant capital and operational costs. The use of ammonia also causes safety risks to the operating personnel, and may result in ammonia salt formation, and fouling and corrosion on cold downstream surfaces of the flue gas channel.

In the automotive industry, it is known to use the so-called Three-way Converters (TWC) to simultaneously reduce the NO$_X$, CO and hydrocarbon (HC) emissions in the exhaust gas. The conventional gasoline engine runs at stoichiometric conditions, controlled by fuel injection. A TWC contains a catalyst, which is usually made of either platinum or palladium together with rhodium on a ceramic or metal substrate. CO functions as the NO$_X$ reductant over the rhodium surface. The excess CO and hydrocarbons are oxidized over the platinum or palladium surfaces.

U.S. Pat. No. 5,055,278 discloses a method of decreasing the amount of nitrogen oxides in waste furnace gas. According to the method, fossilized fuel is passed through gradual pyrolizing combustion for prolonged residence time, and the formed carbon monoxide, hydrocarbons, and possible nitrogen oxides, are passed through catalytic oxidation. Due to the substoichiometric conditions, very high amounts of CO and hydrocarbons are produced, and a large amount of catalyst is required for the oxidation. Contrary to that, the amount of nitrogen oxides in the waste gas is very low, because fuel nitrogen is mainly released as NH$_3$. For this reason, air or oxygen has to be injected as an external oxidant, and mixed uniformly with the flue gas, upstream of the catalyst. The pyrolizing combustion method also suffers from low thermal efficiency due to high levels of unburned carbon in the ash.

For the above-mentioned reasons, there is clearly a need for a new, simple system level integration between the combustion process of a boiler and the downstream flue gas NO$_X$ reduction, which maintains high thermal efficiency and leads to very low NO$_X$ emissions, but does not cause harmful ammonia or CO emissions.

SUMMARY OF THE INVENTION

An object of the present invention is to provide a system and a method for controlling NO$_X$ emissions from boilers combusting carbonaceous fuels, which include a simple and advanced system level integration between the combustion process and downstream flue gas NO$_X$ reduction and which maintain high thermal efficiency of the boiler.

Another object of the present invention is to provide a system and a method for controlling NO$_X$ emissions from boilers combusting carbonaceous fuels, which do not lead to increased emissions of other pollutants.

A special object of the present invention is to provide a system and a method for controlling NO$_X$ emissions from boilers combusting carbonaceous fuels, which do not utilize an external agent.

Thus, according to the present invention, a method for controlling NO$_X$ emissions from a boiler combusting carbonaceous fuels is provided, wherein the method comprises the steps of: (a) introducing carbonaceous fuel and combustion air into a furnace of the boiler for combusting the carbonaceous fuel in oxidizing conditions and producing flue gas including NO$_X$ and CO, (b) leading flue gas from the furnace to a catalyst section in a flue gas channel for converting, free from introducing an external agent for NO$_X$ reduction, NO$_X$ to N$_2$ and CO to CO$_2$ by using CO as the reductant of NO$_X$ on a catalyst in the catalyst section.

Also, according to the present invention, a system for controlling NO$_X$ emissions from a boiler that combusts carbonaceous fuels is provided, the system comprising a furnace including means for introducing carbonaceous fuel and combustion air into the furnace for combusting the carbonaceous fuel in oxidizing conditions and producing flue gas including $NO_X$ and CO, a flue gas channel for leading the flue gas from the furnace to the atmosphere, and a catalyst section in the flue gas channel for converting $NO_X$ to $N_2$ and CO to $CO_2$, by using CO as the reductant of $NO_X$, free from introducing an external agent for $NO_X$ reduction.

According to a preferred embodiment of the present invention, the level of CO generated during the combustion process in the furnace is adjusted to a level at which it reduces $NO_X$ to nitrogen ($N_2$) both in the furnace and in the downstream catalytic section, without using any external reagents, such as ammonia. Preferably, the combustion processes in the furnace are adjusted so that the molar concentration of CO in the flue gas, while it exits the furnace is at least 70% that of $NO_X$. More preferably, the molar concentration of CO at the furnace exit is from about 1 to about 3 times the molar concentration of $NO_X$. We have found that an adequate amount of CO required for $NO_X$ reduction can be generated through optimization of the furnace design and operation parameters.

The operation conditions in the furnace, adjusted to bring about relatively high CO production, also significantly suppress the $NO_X$ generation in the combustion process. In addition to that, when $NO_X$, CO and char are produced in the furnace, the CO acts together with the char in reducing the $NO_X$ level further, according to the following reaction:

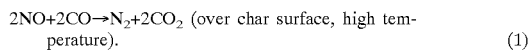

$$2NO+2CO \rightarrow N_2+2CO_2 \text{ (over char surface, high temperature).} \quad (1)$$

According to the present method, the furnace will be operated with high CO concentrations to achieve furnace exit $NO_X$ levels, which, due to the decreased $NO_X$ production and the $NO_X$ reduction in the furnace, are significantly lower than those obtained by using the current low $NO_X$ combustion technologies. When using the present method, the $NO_X$ level at the furnace exit may be below 90 ppm, even below 60 ppm. The CO concentration at the furnace exit is preferably at least 70% that of $NO_X$.

The $NO_X$ level in the flue gas, having a rich $CO/NO_X$ ratio, is further reduced in the catalyst section in the boiler backpass. However, due to the low original $NO_X$ level in the flue gas, the need for catalytic $NO_X$ reduction is relatively low.

According to the present invention, the $NO_X$ reduction on the catalyst takes place without adding any external reagent to the process. In present commercial power plants, ammonia and urea are generally used for performing catalytic or non-catalytic $NO_X$ reduction. However, other reductants such as CO, hydrocarbons (HC), hydrogen, and char are also known to reduce $NO_X$ to nitrogen. The reductant is oxidized in the same reaction, as is shown below for the reaction between $NO_X$ and CO:

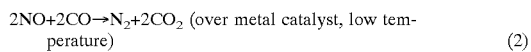

$$2NO+2CO \rightarrow N_2+2CO_2 \text{ (over metal catalyst, low temperature)} \quad (2)$$

This is the same reaction as reaction (1), but with an external metal catalyst. Reaction (2) is proven and widely used in the automotive industry, wherein high $NO_X$ conversion levels, usually between 90 and 99%, are achievable.

A key element of the present invention is to generate appropriate process conditions in the furnace combusting carbonaceous fuels, especially in the furnace of a coal-fired boiler, to produce an adequate $CO/NO_X$ molar ratio in the flue gas to enable the redox process of formula (2) to be used for reducing $NO_X$ and oxidizing CO.

According to a preferred embodiment of the present invention, the desired CO content in the furnace is primarily achieved by adjusting the total amount of combustion air introduced into the furnace, so that a low furnace excess air range is obtained. Preferably, especially for coal-fired combustors, the furnace excess air range is from about 10% to about 20%, even more preferably, from about 13% to about 20%. In some conditions, especially when the fuel is liquid or gaseous fuel, such as fuel oils or natural gas, the furnace excess air range is preferably below 10% and even more preferably, below 5%. However, in order to maintain adequate combustion efficiency, the furnace is operated in oxidizing conditions, i.e., the excess air is above 0%.

As is well-known to persons skilled in the art of combustion control, the $CO/NO_X$ ratio can also be controlled with other design and operational modifications. Examples of such commonly known modifications include the control of overall or local temperatures within the combustor, modifications of the design of the primary combustion zone or the design of the air injection in the burner, etc.

According to the present invention, CO acts on the catalyst as a reductant which reduces $NO_X$ to $N_2$. At the same time, CO oxidizes to $CO_2$. The material, size, geometry and operating temperature of the catalyst are preferably selected so that most, or preferably all, of the $NO_X$ in the flue gas will be reduced on the catalyst. Moreover, any excess CO in the flue gas will preferably be oxidized to $CO_2$ on the surface of the catalyst by the excess oxygen in the flue gas.

The catalyst may be formed of the same materials as the catalysts used in TWCs, i.e., either platinum or palladium together with rhodium on a ceramic or metal substrate. Alternatively, the catalyst may be of some other materials, e.g., oxides of base transition metals, such as iron, nickel, aluminum, cobalt or copper, or a mixture of these oxides. The temperature of the catalyst is preferably, from about 130° C. to about 800° C., even more preferably, from about 200° C. to about 500° C.

The catalyst may preferably contain active ingredients, such as those mentioned above, applied on a ceramic substrate extruded in either honeycomb or plate shapes. The catalyst can also be used in granular or pellet form in a packed bed located in the flue gas channel. Especially, a low-cost catalyst, which is in powdery or granular form, can also be injected directly into the flue gas duct. Then, the catalyst collected in the dust cake of a dust collector can function as a fixed bed for $NO_X$ reduction. The collected catalyst can be recycled to improve its utilization.

The boiler flue gas also contains hydrocarbons (HC), usually in a concentration of a lower order of magnitude than CO. As mentioned earlier, HC can also reduce $NO_X$ through redox reactions similar to the $NO_X$—CO reactions shown in formula (2). Measures taken to increase the amount of CO in the furnace will also, to some degree, increase the HC concentration. However, due to its low concentration and similar reaction mechanism, the effect of HC on $NO_X$ is, in this description of the present invention, combined into the CO reduction effect. Also, in engineering calculations, the $CO/NO_X$ molar ratio may include the contribution of the equivalent of a $CH_4/NO_X$ ratio.

By optimizing the entire $NO_X$ formation and destruction processes according to the present invention, a high combustion efficiency can be maintained and very low levels of $NO_X$ from the boiler system can be achieved by using a small catalyst section and without adding any external reductant, such as ammonia, typically used for SCR processes.

DESCRIPTION OF A PREFERRED EMBODIMENT

Figure 1:
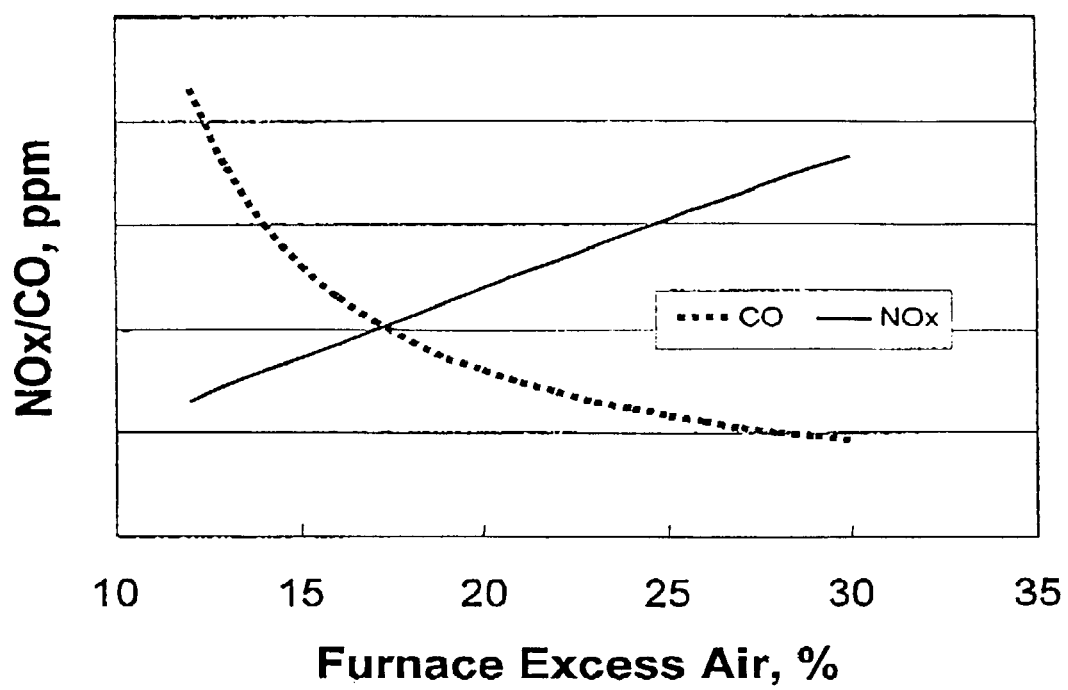
FIG. 1 is a diagram of the impact of furnace excess air on $NO_X$ and CO emissions.

FIG. 1 shows a qualitative diagram of the impact of furnace excess air on the $NO_X$ and CO emissions. As is shown in the diagram, by increasing the excess air, the $NO_X$ level is increased and the CO level is decreased. Because an adjustment of the excess air affects both the $NO_X$ and CO levels, but in opposite directions, a small deviation in excess air will produce a wide variation in CO/$NO_X$ ratio. Currently, coal-fired boilers are designed for 20–25% excess air levels.

According to the present invention, the CO/$NO_X$ ratio at the furnace exit is preferably above 0.7. Even more preferably, the CO/$NO_X$ ratio at the furnace exit is from about 1 to about 3. The most straight-forward means to achieve a CO/$NO_X$ ratio that is appropriate for the downstream catalytic reduction is to adjust the ratio of air and fuel introduced to the furnace. According to the present invention, the furnace excess air is preferably in the range from about 10% to about 20%, even more preferably, in the range from about 13% to about 20%.

Figure 2:
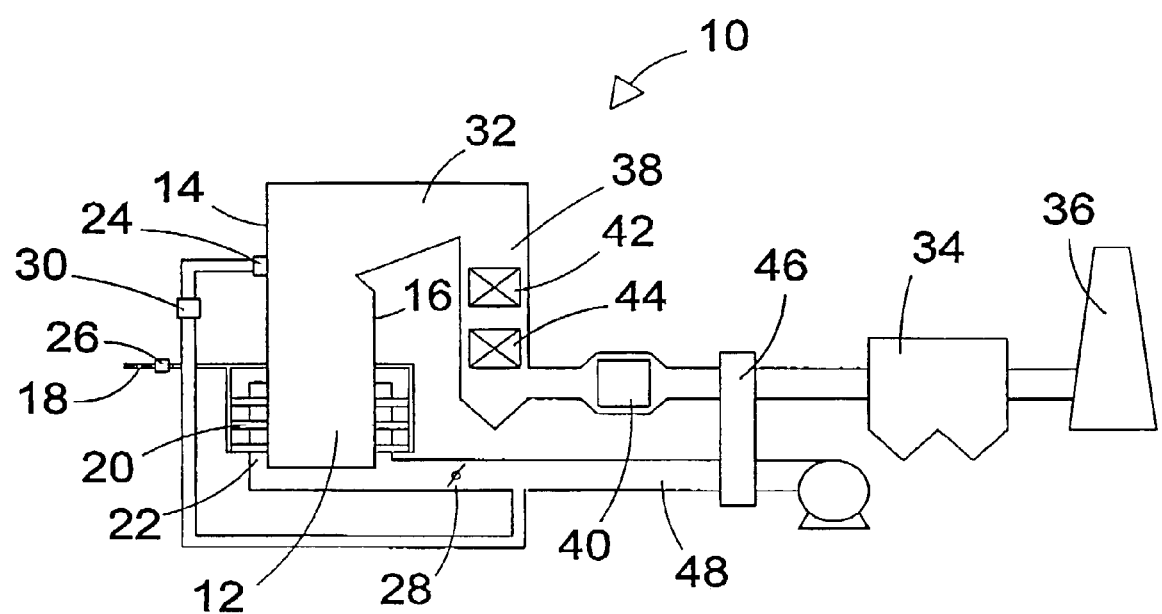
FIG. 2 is a schematic diagram of an embodiment of the proposed $NO_X$ reduction system according to the present invention.

FIG. 2 shows, as a preferred embodiment of the present invention, a pulverized coal (PC) fired boiler 10 with an integrated $NO_X$ reduction system. The boiler 10 comprises a furnace 12 enclosed with vertical tube walls, of which only walls 14 and 16 are shown in FIG. 2. The furnace is operated in oxidizing conditions, and therefore the walls 14, 16 can be made of normal carbon steel, and do not have to be completely covered with refractory material or to be made of corrosion resistant material.

The boiler 10 comprises means 18 for introducing fuel and primary air through the burners 20 into the furnace 12. Adjacent to the burners 20 are disposed means 22 for introducing secondary air into the furnace 12. At the upper portion of the furnace 12 are disposed means 24 for injecting over-fire-air. The means for introducing fuel, secondary air and over-fire-air preferably comprise means 26, 28, 30 for controlling the streams of fuel, secondary air and over-fire-air, respectively, introduced into the furnace.

Flue gases produced during the combustion of the fuel in the furnace 12 are conducted from the furnace 12 through a flue gas channel 32, a dust collector 34 and a stack 36 to the atmosphere. The flue gas channel 32 comprises a heat transfer section 38, and a catalyst section 40 (having a catalyst as discussed in more detail below) disposed downstream from the heat transfer section 38. The combustion of the fuel in the furnace 12 is preferably performed with relatively low, say 10–20%, excess air. In these operating conditions, the amount of $NO_X$ at the furnace exit is low, usually below 90 ppm. Simultaneously, the concentration of CO in the flue gas increases to a higher level than normal. Due to the low $NO_X$ level, the catalyst in the catalyst section 40 is of a relatively small size.

According to the present invention, CO acts on the catalyst in the catalyst section 40 as a reductant, which reduces $NO_X$ in the flue gas to $N_2$. At the same time, CO oxidizes to $CO_2$. The material, size, geometry and operating temperature of the catalyst in the catalyst section 40 are selected so that most, or preferably all, of the $NO_X$ in the flue gas will be reduced on the catalyst. Any excess CO in the flue gas will preferably be oxidized to $CO_2$ on the surface of the catalyst by the excess oxygen in the flue gas. As an example, the catalyst may be formed of either platinum or palladium together with rhodium on a ceramic or metal substrate. Other possibilities for the catalyst material include oxides of base transition metals, such as iron, nickel, aluminum, cobalt or copper, or a mixture of these oxides.

Preferably, the boiler includes heat transfer surfaces, such as superheaters 42 and economizers 44, in the flue gas channel upstream from the catalyst section 40. By the heat transfer surfaces 42, 44 the temperature of the flue gas may be adjusted to the optimum operating range of the catalyst. The catalyst is preferably operated at a temperature from about 130° C. to about 800° C., most preferably, from about 200° C. to about 500° C. In the flue gas channel 32 downstream from the catalyst section 40 is located an air preheater 46 for heating the air in the air channel 48.

As is clear from FIG. 2, the boiler, including means for utilizing integrated $NO_X$ control according to the present invention, is very simple. The only major difference from a conventional boiler having an SCR unit is that the present boiler does not include means for handling and injecting an external $NO_X$ reducing agent. According to the present invention, the CO concentration in the flue gas is adjusted so that the CO reduces most or all of the $NO_X$ in the flue gas at the catalyst section 40.

The CO concentration in the flue gas is preferably adjusted by using an appropriate excess air level in the furnace 12. The boiler design may also include small modifications, e.g., certain local temperatures in the furnace 12, or modifications in the combustion zone or burner design, to control the CO/$NO_X$ ratio at the furnace outlet. Generally, however, the boiler itself does not differ substantially from a conventional boiler.

A significant advantage of the present system is that CO replaces ammonia for catalytic reduction of $NO_X$. Thus, the catalytic section is essentially an ammonia-free SCR. The capital costs, operating expenses and safety risks associated with the use of ammonia are avoided. The reductant is inherently generated during the boiler combustion process at no additional cost and without external handling. All the equipment associated with ammonia handling and injection, such as a storage tank, pumping and flow metering, vaporization, distribution and injection, is eliminated.

A critical requirement of conventional SCRs for efficient $NO_X$ reduction and ammonia slip control is uniform mixing of $NH_3$ with the flue gas. This requirement leads to expensive equipment, including an ammonia injection grid, flow mixers, multiple turning vanes and a flow rectifier grid. Such equipment is not needed in the present system, since the reductant (CO) reaching the catalyst section 40 is already uniformly distributed in the flue gas channel 32, especially when passing through the heat exchange banks, i.e., superheaters 42 and economizers 44, in the flue gas channel 32.

Furthermore, the present system also eliminates downstream problems associated with conventional SCRs, such as ammonia slip and the formation of ammonia bisulfate, which can cause fouling and corrosion of the air preheater surfaces 46, especially when high sulfur fuels are fired.

The operation of the boiler of our invention differs from that of a conventional boiler in that it allows the full potential of $NO_X$ control by the excess air adjustment to be utilized. Thus, the present method breaks the conventional relationship between furnace $NO_X$ and CO behavior. In fact, this concept inverts the $CO/NO_X$ relationship from being opposing to being supportive by utilizing the CO as a reductant.

The present concept provides an economic system for achieving low furnace outlet $NO_X$ and high back-end catalytic $NO_X$ reduction without causing increased CO or $NH_3$ emissions or decreased boiler efficiency. The present invention is applicable to PC boilers, CFB boilers and other combustors used for burning solid carbonaceous fuels. The invention may as well be applied to boilers that combust liquid or gaseous carbonaceous fuels.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims.

We claim:

1. A method for controlling $NO_X$ emissions from a boiler that combusts carbonaceous fuels, the method comprising the steps of:
    (a) introducing carbonaceous fuel and combustion air into a furnace of the boiler for combusting the carbonaceous fuel in oxidizing conditions and producing flue gas that includes $NO_X$ and CO, and adjusting the operating conditions in the furnace so as to decrease the molar concentration of $NO_X$ and to increase the molar concentration of CO at the furnace exit such that the molar concentration of CO at the furnace exit is at least 70% the molar concentration of $NO_X$; and
    (b) leading flue gas from the furnace to a catalyst section in a flue gas channel for converting $NO_X$ to $N_2$ and CO to $CO_2$ by using CO as the reductant of $NO_X$ on a catalyst in the catalyst section,
  wherein no external reagent is introduced into the flue gas channel.

2. A method according to claim 1, wherein the ratio of the molar concentrations of CO and $NO_X$ at the furnace is exit is above 0.7.

3. A method according to claim 1, wherein the ratio of the molar concentrations of CO and $NO_X$ at the furnace exit is from about 1 to about 3.

4. A method according to claim 1, further comprising controlling the operating conditions in the furnace by adjusting the amount of combustion air introduced into the furnace.

5. A method according to claim 4, wherein the amount of combustion air introduced into the furnace is controlled so that the furnace excess air is from about 10% to about 20%.

6. A method according to claim 5, wherein the furnace excess air is from about 13% to about 20%.

7. A method according to claim 4, wherein the furnace excess air is below 10%.

8. A method according to claim 7, wherein the fuel is liquid or gaseous fuel, and the furnace excess air is is below 5%.

9. A method according to claim 8, wherein the fuel is fuel oil or natural gas.

10. A method according to claim 1, further comprising controlling the molar concentration of CO at the furnace exit to a level at which it reduces on the catalyst most of the $NO_X$ generated during the combustion.

11. A method according to claim 1, wherein the furnace parameters are adjusted so that in normal operating conditions of the furnace the molar concentration of CO at the furnace exit is at least 70% of the molar concentration of $NO_X$.

12. A method according to claim 1, wherein the active materials of the catalyst are selected from a group consisting of platinum, palladium, rhodium, and oxides of base transition metals, and mixtures thereof.

* * * * *